United States Patent [19]

Ehsani

[11] Patent Number: 5,208,740
[45] Date of Patent: May 4, 1993

[54] INVERSE DUAL CONVERTER FOR HIGH-POWER APPLICATIONS

[75] Inventor: Mehrdad Ehsani, Bryan, Tex.

[73] Assignee: The Texas A & M University System, College Station, Tex.

[21] Appl. No.: 707,852

[22] Filed: May 30, 1991

[51] Int. Cl.⁵ .................................... H02M 3/135
[52] U.S. Cl. ................................... 363/124; 363/65
[58] Field of Search ............... 363/15, 17, 27, 28, 363/96, 98, 65, 68, 71, 95, 124, 136

[56] References Cited

U.S. PATENT DOCUMENTS

| | | | |
|---|---|---|---|
| 3,699,425 | 10/1972 | Hermansson et al. | 363/27 |
| 4,079,305 | 3/1978 | Peterson et al. | 363/27 |
| 4,245,287 | 1/1981 | Kustom et al. | 363/27 |
| 4,399,499 | 8/1983 | Butcher et al. | 363/17 |
| 4,523,269 | 6/1985 | Baker et al. | 363/98 |
| 4,663,699 | 5/1987 | Wilkinson | 363/98 |
| 4,706,178 | 11/1987 | Hayashi | 363/98 |
| 4,953,068 | 8/1990 | Henze | 363/17 |
| 5,027,264 | 6/1991 | DeDoncker et al. | 363/17 |

OTHER PUBLICATIONS

Wasynczuk et al., "Simulation and Control of a 20–Khz Spacecraft Power System", Sep. 1989 IEEE, vol. 25, No. 5 pp. 668–76.
Schwarz et al., "A Controllable 45–Kw Current Source For DC Machines", Jul. 1979 IEEE.
Ehsani et al., "Analysis of the Inductor–Converter Bridge by Discontinuous Functions", Dec. 1981 IEEE.
Liu et al., "Zero–Voltage Switching Technique In DC/DC Converters", Dec. 1986 IEEE.
Singer; "Gyrators Application In Power Processing Circuits", Aug. 1987, IEEE.
Patterson, et al., "Pseudo–Resonant Full Bridge DC/DC Converter", Dec. 1987 IEEE.
Bilgic et al., "Analysis of Inductor–Converter Bridge by State-Space Averaging Technique", Apr. 1988.
Ehsani et al., "Converter Circuits for SMES", Dec. 1988, pp. 170–186, Chapter 7.
Husain, "Analysis and Design of a High Power DC/DC Converter", Sep. 1990, Texas A & M Masters Thesis.

*Primary Examiner*—Steven L. Stephan
*Assistant Examiner*—Jeffrey Sterrett
*Attorney, Agent, or Firm*—Baker & Botts

[57] ABSTRACT

An inverse dual converter circuit (20) provides continuous voltage step-up or step-down control over a wide range and without the need of a transformer. The converter comprises an input DC voltage source (22) for generating an input DC voltage. An inverse dual converter bridge receives the input DC voltage and comprises a network of source voltage converters (26), an AC link circuit (28), and a network of load voltage converters (32). The source voltage converters (26) and load voltage converters (32) operate at the same frequency, but at a different phase. The AC link circuit (28) stores energy to be transferred from the source voltage converters (26) to the load voltage converters (32) and supplies reverse voltage bias for commutation. The inverse dual DC-DC (20) converter may include circuitry (180) for controlling the output DC voltage and for regulating output current continuity. Topological variations of the basic circuit include transformer coupled (140), multi-phase (80) and multi-pulse derivations. The single-phase inverse dual converter circuit (20) offers a buck-boost operation over a wide range without a transformer, bi-directional power flow, and complimentary commutation of converters. The commutation mechanism provided in the inverse dual converter circuit (20), when combined with gate turn-off switch thyristors, provides zero current switching. This allows operation at high frequencies in high-power applications, with high efficiency.

49 Claims, 6 Drawing Sheets

INVERSE DUAL CONVERTER FOR HIGH-POWER APPLICATIONS

TECHNICAL FIELD OF THE INVENTION

The present invention relates to electrical power conversion, and more particularly to a inverse dual DC-DC converter for high-power applications capable of continuous voltage step-up or step-down control over a wide voltage range.

BACKGROUND OF THE INVENTION

DC-DC power conversion at low- to medium-power levels is possible using several classical and new topologies that employ MOSFETs or BJTs for active current switching. These topologies have very high frequencies for advantageously reducing reactive element sizes. However, these converters do not scale up efficiently when the power requirements extend to the hundreds of kW or MW range.

Resonant converters which use a capacitor and inductor in series to provide DC-DC conversion suitable for high-power applications are advantageous because of their natural commutation and soft switching ability. Examples of such converters include the series resonant converter (SRC) (see F. C. Schwarz & J. B. Klassen, "A Controllable 45-kW Current Source for DC Machines," IEEE Trans. on Ind. Appl., Vol. IA-15, No. 4, pp. 437–444, Jul./Aug. 1979), all quasi-resonant converters (see K. H. Liu & F. C. Lee, "Zero Voltage Switching Technique in DC/DC Converters," IEEE-PESC records, pp. 58-70, 1986), as well as the pseudo-resonant full-bridge converter (see D. M. Divan & O. Patterson, "A Pseudo-Resonant Full Bridge DC/DC Converter," IEEE-PESC Records, pp. 424–430, 1987).

Resonant converters, however, suffer from significant limitations in high-power applications. First of all, resonant converters require careful matching of the operating frequency at the resonant tank components. Secondly, any magnetic saturation or other unexpected drift in resonant frequency can result in operating failure. Moreover, during the resonant converter's operation, its input and output capacitor filters must handle large ripple currents and significant voltage and current stresses. Furthermore, using resonant converters it is not possible to step up or step down voltage without a transformer.

Thus, there is a need for a DC-DC converter circuit that does not require careful matching of operating frequency to components within the converter.

There is a need for a DC-DC converter that does not experience operational failure as a result of magnetic saturation or unexpected drift.

Other demands that the above DC-DC converters cannot begin to satisfy are the smaller size and lower weight requirements that are applicable to many high-power aerospace applications. To achieve high-power conversion in small, light-weight components, it is necessary to reduce transformer size and LC filter components. Primarily, this requires operation at high switching frequencies and reduction in device switching losses by applying soft-switching techniques.

Therefore, there is a need for a DC-DC converter circuit having smaller size and lower weight than known systems for high-power applications, including aerospace applications.

There is a need for a DC-DC converter circuit having a smaller transformer size and smaller LC filter components.

Moreover, there is a need for a DC-DC converter circuit capable of operating at higher switching frequencies with reduced switching losses.

SUMMARY OF THE INVENTION

The present invention, accordingly, provides an inverse dual DC-DC converter for high-power applications that substantially eliminates and reduces disadvantages and limitations associated with known DC-DC converter circuits and methods.

According to one aspect of the invention, the inverse dual DC-DC converter for high-power applications comprises an input DC voltage source that, through a source inductor, provides a DC current to an inverse dual converter bridge circuit having a source side and a load side. The converter bridge comprises a set of source thyristors or converters on the source side and a set of load thyristors or converters on the load side. The source and load sides of the converter bridge operate at a common frequency for first converting an input DC voltage to an AC voltage and then converting the AC voltage to an output DC voltage. The converter bridge circuit has an AC link circuit between the source and load sides. The AC link has an AC link capacitor that stores energy to be transferred from the source side to the load side. The AC link capacitor also supplies reverse voltage for commutation of the converter bridge switches. Moreover, the inverse dual converter bridge circuit comprises source converters and load converters. The source and load converters operate with a phase difference, but at a common frequency. The phase difference and the common frequency provide output voltage control and input current continuity.

The source converters operate in a predetermined switching sequence. In the preferred embodiment, source converter switches $S_{S1}$, $S_{S2}$, $S_{S3}$ and $S_{S4}$ employ a switching sequence of $S_{S1}S_{S4}$, $S_{S2}S_{S3}$, $S_{S1}S_{S4}$, etc. Similarly, load converter switches $S_{L1}$, $S_{L2}$, $S_{L3}$, and $S_{L4}$ operate in the switching sequence of $S_{L1}S_{L4}$, $S_{L2}S_{L3}$, $S_{L1}S_{L4}$, etc.

A technical advantage of the present invention is that the inverse dual DC-DC converter demonstrates complementary commutation that eliminates the need for external commutation circuitry. In essence, the firing of one SCR or converter switch commutates the other one (i.e., in the above sequence $S_{S1}$ fires $S_{S4}$, $S_{S2}$ fires $S_{S3}$, $S_{S1}$ fires $S_{S4}$, etc.). As a result, the frequency does not depend on resonance for converter operation.

Another technical advantage of the present invention is that it provides continuous voltage step-up or step-down control without the need for transformers.

Yet another technical advantage of the present invention is that it employs small component values for $L_S$, $L_L$, and $C_L$ in the circuit. This permits the DC-DC converter of the present invention to have much shorter response times and active control for maintaining desired output voltages.

Another technical advantage of the present invention is that capacitor commutation produces a zero current condition in the off-going switch. As a result, when this zero current condition combines with the characteristics of a gate turn-off switch, such as a GTO or an MCT (gate turn-off thyristor or a MOS-controlled thyristor), theoretically zero turn-off switching losses result. Therefore, the inverse dual converter may operate at high powers and high frequencies with very small switching losses. The ability to operate at high frequency without additional loss penalties permits size reductions in all inductances and capacitances in the circuit.

Another technical advantage of the present invention is that its capacitor commutation makes possible the use of silicon controlled thyristors (SCRs). Since large voltage-ampere rating SCRs are available, high-power inverse dual converters may be built using individual SCRs or a combination of series and parallel SCRs for each switch element in the converters.

BRIEF DESCRIPTION OF THE DRAWINGS

The invention and its modes and use and advantages are best understood by reference to the following description of illustrative embodiments read in conjunction with the accompanying drawings, wherein.

DETAILED DESCRIPTION OF THE INVENTION

The preferred embodiment of the present invention is best understood by referring to the FIGURES, wherein like numbers are used for like and corresponding parts of the various documents.

Figure 1A:
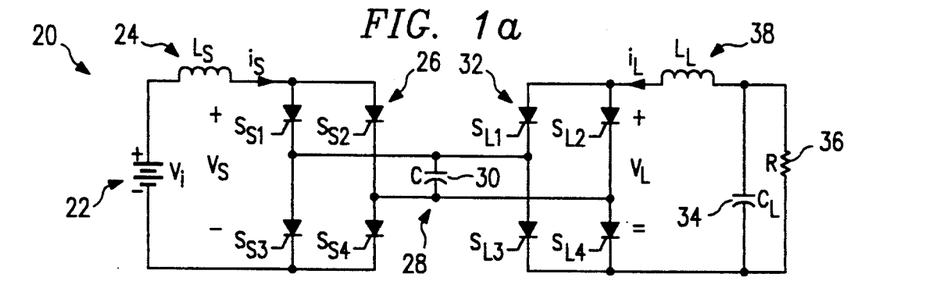
FIG. 1a provides a schematic circuit diagram a single phase inverse dual converter according to the preferred embodiment.

FIG. 1a the inverse dual converter of the preferred embodiment which provides a new topological concept in DC-DC power conversion that is suitable for high-power applications. The family of converters that the present invention provides employs a complementary commutation technique that eliminates the need of external commutation circuitry. In this method, the firing of one thyristor commutates a complementary thyristor. However, the converter's frequency may be changed over a wide range, because the converter does not depend on resonance for operation. Furthermore, the present invention provides continuous voltage step-up or step-down control over a wide voltage range without the use of transformers.

Referring more particularly to FIG. 1a, the single phase implementation of the preferred embodiment provides a DC-DC converter 20 that is supplied with input DC voltage $V_1$ 22 to create a current through source inductor $L_S$ 24 to source converter 26. Source converter 26 comprises thyristors $S_{S1}$, $S_{S2}$, $S_{S3}$, and $S_{S4}$. From source converter 26, current $i_S$ flows through capacitor link circuit 28. Capacitor link circuit 28 includes AC link capacitor 30 and connects to load converter 32. Load converter 32 comprises thyristors $S_{L1}$, $S_{L2}$, $S_{L3}$, and $S_{L4}$. From load converter 32, current $i_L$ flows to load capacitor $C_L$ 34 and load resistor R 36 and then to load inductor $L_L$ 38.

In inverse dual DC-DC converter 20 of FIG. 1a, a clock-driven sequence of pulses of constant switching intervals drives the source converter 26 and load converter 32. The switching sequence on the source converter 26 side is $S_{S1}S_{S4}$, $S_{S2}S_{S3}$, $S_{S1}S_{S4}$, etc. A similar switching sequence, $S_{L1}S_{L4}$, $S_{L2}S_{L3}$, $S_{L1}S_{L4}$, etc., and the same frequency is used on load converter 32. Source converter 26 and load converter 32 switching events need not be synchronized, but must be of the same or common frequency. Proper design and control of converter circuit 20 assures continuous conduction in source inductor $L_S$ 24 and load inductor $L_L$ 38 as well as proper commutation of the switching elements by AC link capacitor 30.

AC link capacitor 30 serves two purposes. First, AC link capacitor 30 temporarily stores the energy to be transferred from source converter 26 to load converter 32. Moreover, AC link capacitor 30 supplies the reverse voltage necessary for commutation of switches between the $S_{S1}S_{S4}$ and $S_{S2}S_{S3}$ on source converter 26 and $S_{L1}S_{L4}$ and $S_{L2}S_{L3}$ on load converter 32. The common converter frequency for source converter 26 and load converter 32 and the difference in phase between source converter 26 and load converter 32 provide output voltage control and input current continuity.

Figure 2:
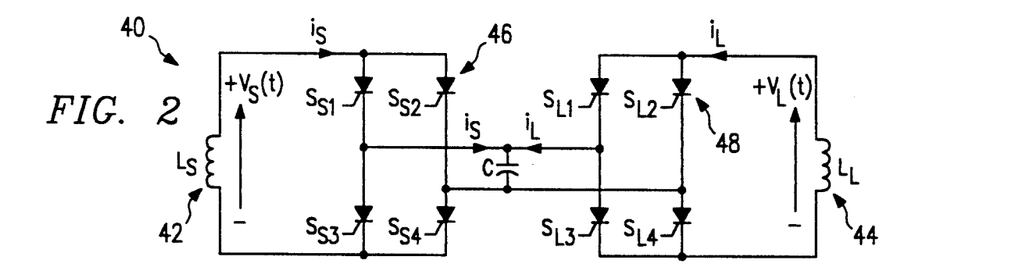
FIG. 2 shows a single-phase inductor-converter bridge associated with the preferred embodiment.

To understand the operation of converter circuit 20, it is beneficial to refer to the known inductor-converter bridge (ICB) circuit 40 of FIG. 2. ICB circuit 40 is described in detail in M. Ehsani, et al., "Analysis of the Inductor-Converter Bridge by the Use of Discontinuous Functions," IEEE-Ind. Appl. Soc., 1981 Conference Record, (hereinafter "*ICB Article*") which is here incorporated by reference. ICB circuit 40 is a current source DC-DC converter system for reversible energy transfer betweentwo high Q inductors $L_S$ 42 and $L_L$ 44. Quadro-metric techniques (see *ICB Article supra*) and state space averaging techniques have been Applied to obtain an average solution of ICB circuit 40 (see M. O. Bilgic & M. Ehsani "Analysis of ICB by Means of State Averaging Technique," IEEE-PESC Conf. Rec., pp. 116–122, Apr. 1, 1988). The coil voltages $V_S(t)$ and $V_L(t)$ averaged over a cycle have been determined to be:

$$V_S = -L_S I_S = K I_L \tag{1}$$

$$V_L = -L_L = -K I_S \tag{2}$$

with with $$K = \frac{\phi - (\phi^2/\pi)}{\omega C}, \quad 0 < \phi < \pi \tag{3}$$

where $I_S$ and $I_L$ are the average coil currents over the same cycle, $\omega$ is the angular frequency of converter 46 and $\phi$ is the load converter advance angle.

The average load power in lossless single-phase ICB circuit 40 was shown to be:

$$<P< = K I_S I_L$$

$$<P> = K I_S I_L$$

or $$<P> = \frac{I_S I_L}{\omega C}\left(\phi - \frac{\phi^2}{\pi}\right), \quad 0 < \phi < \pi \tag{4}$$

The process of energy transfer in ICB circuit 40 can also be effectively implemented from a voltage source converter instead of a super-conducting coil. In the inverse dual DC-DC converter 20 of FIG. 1, the superconducting ICB coils $L_S$ 42 and $L_L$ 44 of FIG. 2 have been replaced by two filter inductors $L_S$ 24 and $L_L$ 38 and voltage source $V_i$ 22 is the input source of energy. The energy may be transferred to load R 36 using the same principle as in ICB circuit 40. Depending on which of the switches are conducting, there are four distinct topologies identified as $S_{S1}S_{S4}\text{-}S_{L1}S_{L4}$, $S_{S1}S_{S4}\text{-}S_{L2}S_{L3}$, $S_{S2}S_{S3}\text{-}S_{L2}S_{L3}$ and $S_{S2}S_{S3}\text{-}S_{L1}S_{L4}$.

Figure 3A:
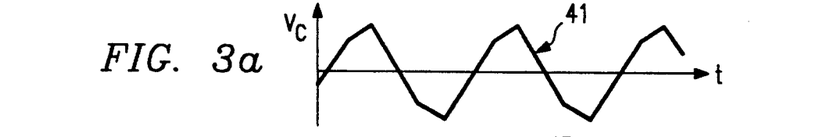
FIGS. 3a through 3c plot the voltage wave forms characteristic of the preferred embodiment.
Figure 3B:
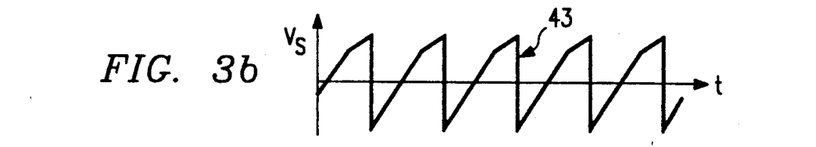
Figure 3C:
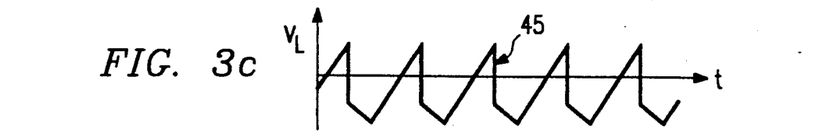

FIGS. 3a through 3c illustrate the voltage wave forms for the AC voltage within DC-DC converter circuit 20. FIG. 3a illustrates the AC voltage 41 across link capacitor 30. FIG. 3b and 3c, respectively, show the AC voltage 43 across source converter 26 and the AC voltage 45 across load converter 32. In particular, FIGS. 3b and 3c illustrate the phase difference that exists between source converter 26 and load converter 32.

Figure 1B:
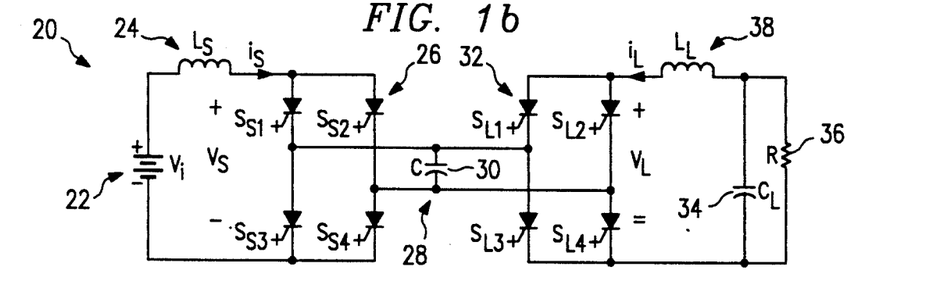
FIG. 1b illustrates a schematic circuit diagram of an inverse dual converter according to the present invention with gate turn-off devices.

The inverse dual converter circuit 20 of the preferred embodiment employs AC link capacitor 30 as the voltage transfer element. The complementary commutation that AC link capacitor 30 provides permits the use of SCRs or thyristors within source converter 26 and load converter 32. As a result, the power rating of converter circuit 20 may be scaled, by design, to very high power levels. In fact, power levels in the MW range are feasible using high-voltage thyristor converter technology. Furthermore, gate turn-off switches (e.g., GTOs or MCTs) may be used instead of SCRs, as shown in FIG. 1b. The combined current commutation and gate turn-off will allowefficient converter switching at much higher frequencies than the frequencies possible using SCRs. Thus, the filter sizes may be further reduced in certain high-power applications.

Understanding the inverse dual converter of the preferred embodiment is significantly facilitated through gyrator modeling techniques. A gyrator, similar to an ideal transformer, is a realizable network that couples an input port to an output port through a gyrostatic coefficient. It is a lossless and storageless two-port network which transforms one-port networks into their dual with respect to their gyration conductance. For example, an input voltage source is viewed as a current source at the gyrator output and vice versa. Similarly, a capacitance is seen an inductance and so on.

Figure 4:
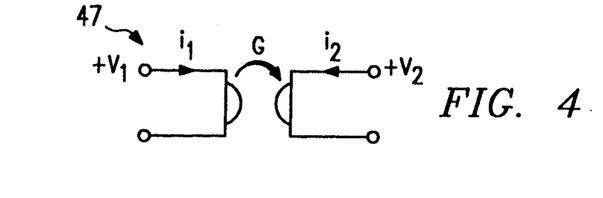
FIG. 4 provides a symbolic representation of a gyrator model used to illustrate concepts associated with the preferred embodiment.

FIG. 4 shows the circuit symbol 47 for the basic gyrator to illustrate the following defining equation:

$$i_1 = g v_2$$
$$i_2 = -g v_1 \tag{5}$$

where g is called the gyration conductance and has the unit $1/\Omega$.

The gyrator realization of power electronic converters is based on the assumption that the output power equals instantaneous input power, i.e., $p_o = p_1$, and is called the POPI circuit (see S. Singer "Gyrators in Power Processing Circuits," IEEE Trans. on Ind. Elec. Vol. IE-34, No. 3, pp. 313-318, Aug. 1987). This, in fact is a loss-free realization of the ideal gyrator along with a signal h(t) driving the POPI circuit which is the control element. In the following, it will be shown that converters with a link capacitor such as capacitor 30 behave naturally as a gyrator without any external control components.

In the case of the inductor-converter bridge, from Equations (1) and (2), the following relationship exists:

$$\frac{<v_L>}{<i_s>} = \frac{<v_s>}{<i_L>} = k \tag{6}$$

where k is defined in Equation (3). Comparing with the gyrator equation, $$\frac{<v_2>}{<i_1>} = -\frac{<v_1>}{<i_2>} = \frac{1}{g} \tag{7}$$

The gyration conductance is $$g = \frac{1}{k} = \frac{\omega C}{\phi - (\phi^2/\pi)} \tag{8}$$

Observing that the switching topology of the inverse dual converter 20 is the same as that of inductor-converter bridge circuit 40, the gyration conductance of both the inductor-converter bridge 40 and the inverse dual converter 20 will be the same.

Figures 5, 7:
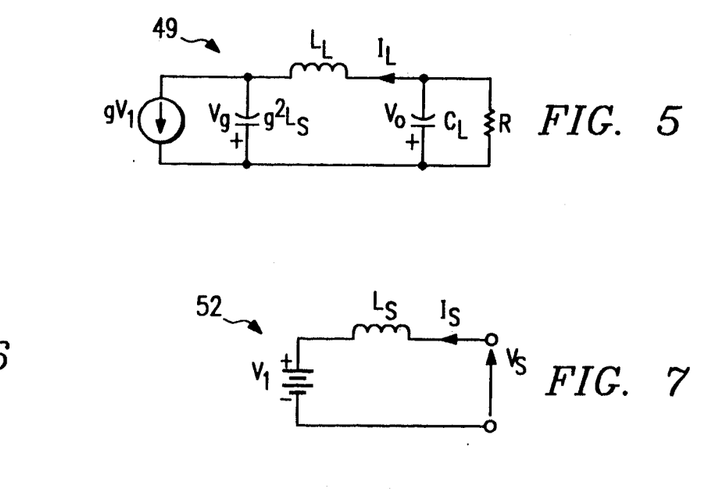
FIG. 5 shows a schematic diagram of a gyrator-equivalent circuit of the preferred embodiment viewed from the load side.
FIG. 7 illustrates a schematic circuit diagram of the voltage appearing across the source inductor $L_S$ of the preferred embodiment.

The averaged gyrator model of the inverse dual converter 20 is very helpful in analyzing circuit 20. The circuit may be modeled viewing from both the source side and the load side. FIG. 5 shows the equivalent circuit 48 with the source $V_i$ 22 and the source capacitor $L_S$ 24 transformed to the load side. In steady state, $$I_L = g V_i \tag{9}$$

$$V_o = I_L R = g V_i R \tag{10}$$

The DC gain is given by, $$\frac{V_o}{V_i} = gR = \frac{\omega C}{(\phi - (\phi^2/\pi))} \cdot R \qquad (11)$$

Power flow is, $$<P> = \frac{I_S I_L}{g} = \frac{I_S I_L}{\omega C}(\phi - (\phi^2/\pi)) \qquad (12)$$

Figure 6:
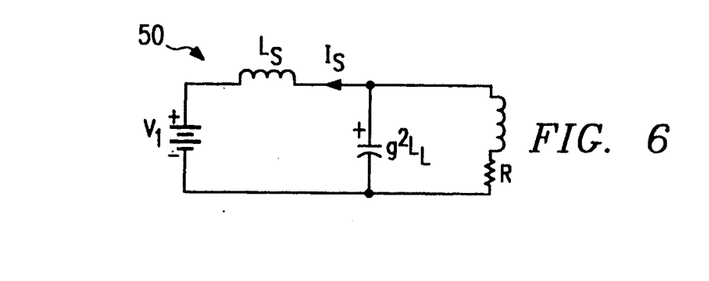
FIG. 6 provides a schematic diagram of the gyrator-equivalent circuit of the preferred embodiment viewed from the source side.

FIG. 6 illustrates the equivalent circuit 50 viewed from the source side. The steady state input current is given by the following equation:

$$I_s = \frac{V_i}{1/g^2R} = V_i g^2 R \qquad (13)$$

The gyrator model may be used effectively to set the design rules for inverse dual converter 20 of the preferred embodiment. The complete design of inverse dual converter circuit 20 includes solving for the values of AC link capacitor 30, source inductor $L_S$ 24, filter $C_L$ 34, and load inductor $L_L$ 38, as well as specifying the voltage and current ratings on these components.

The gyration conductance g may be found for a converter circuit such as converter circuit 20 with given power ratings and specified output voltage using Equation (12). Choosing an appropriate operating space permits obtaining the value of capacitance for AC link capacitor 30 from Equation (8).

To find the source inductor $L_s$ 24, it is appropriate to consider the instantaneous voltage $V_l$ that appears across inductor $L_s$ 24 as shown in the simplified circuit 52 of FIG. 7. The ripple current $\Delta i_s$ across the inductor $L_S$ is given by the following equation:

$$\Delta i_s = \frac{1}{L_2} \int_0^{t_c} (V_i - v_s) dt \qquad (14)$$

where $t_c = t$ and $V_i = V_s(t)$. In most cases, DC-DC converters are applied either to step-up or step-down a voltage. The difference in magnitudes of the source and load inductor currents will then be significant and for illustration purposes is practical to consider only one.

For example, consider the situation where converter circuit 20 operates as a step-up converter such that $I_S >> I_L$ and the ripple current turns out to be, $$\Delta i_s = \frac{I_S}{32 C L_s f^2} \qquad (15)$$

The source inductor $L_S$ 24 is then given by the following equation:

$$L_s = \frac{1}{32 C r f^2} \qquad (16)$$

such that, $r = \Delta i_s/I_s =$ the ripple factor; and f = operating frequency.

A similar derivation and an additional assumption that the ripple factor equals the output dc voltage at $t = T/4$ will lead to the following expression for load inductor $L_L$ 38:

$$L_L = \frac{n}{32 r f^2 C} \qquad (17)$$

where, $n = I_S/I_L =$ the ratio of input and output average currents. The above assumptions lead to the conclusion that the inductor design is not dependent on the operating phase. In practice, however, the current ripple does depend on the operating phase, but ripple is negligible.

Assuming that all of the ripple current passes through load capacitor $C_L$ 34 and not through load R 36, output filter capacitor $C_L$ 34 may be estimated by the following equation:

$$C_L = \frac{\Delta i_1}{8 f_r \Delta V_{CL}} \qquad (18)$$

where $f_r$ = ripple frequency; and $\Delta V_{CL}$ = ripple voltage in capacitor $C_L$ 34. (See I. Husain, M. S. Thesis, "Analysis and Design of High Power DC-DC Converter," Texas A&M University, College Station, Texas, (Aug. 1989).)

In one implementation of the preferred embodiment, a small 220 watt proof-of-principle single-phase converter circuit 20 was built in the Power Electronics Laboratory at Texas A&M University. Two 4 mH inductors ($L_S$ 24 and $L_L$ 38) were wound on iron powder cores. The AC link capacitor 30 values were between 0.5 and 3 μF for different experiments. The frequency range for the experiments were between 2 and 5 kHz.

For $V_{in}$=109 V, $I_{in}$=1.75, A, $V_O$=100 V, $I_o$=1.68 A,, f=2.4 kHz, $\phi$=90° and C=1.39 μF, the estimated efficiency was 94%. Snubbers of 3 μH were added to each of the thyristor currents. However, no dv/dt snubber was necessary.

Figure 8:
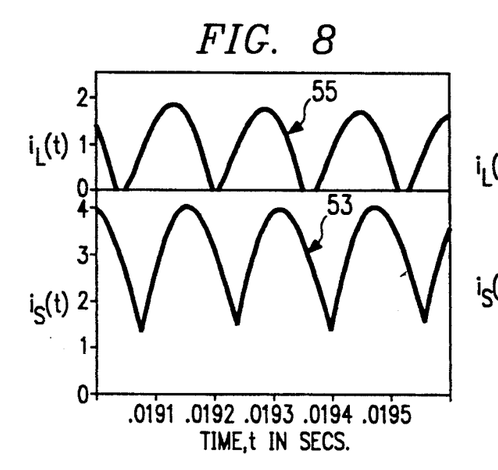
FIG. 8 illustrates simulation input and output voltage results for one implementation of the preferred embodiment.
Figure 9:
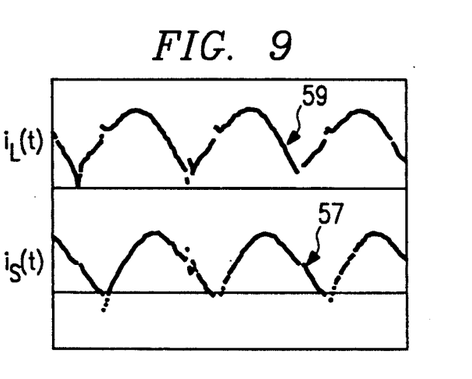
FIG. 9 illustrates empirically-derived results for the same implementation of the preferred embodiment as simulated in FIG. 8.
Figure 10:
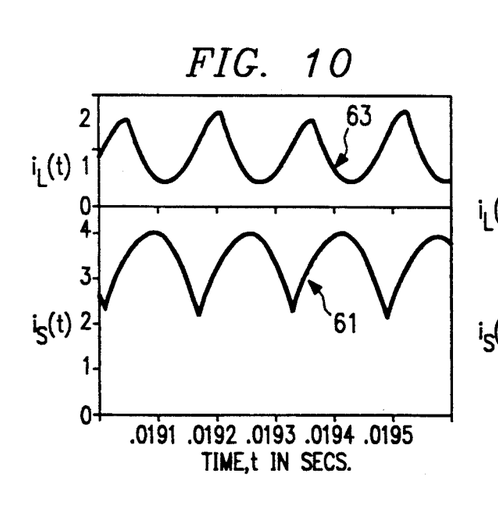
FIGS. 10 and 11 show, respectively, simulation and empirical results for yet another implementation of the preferred embodiment.
Figure 11:
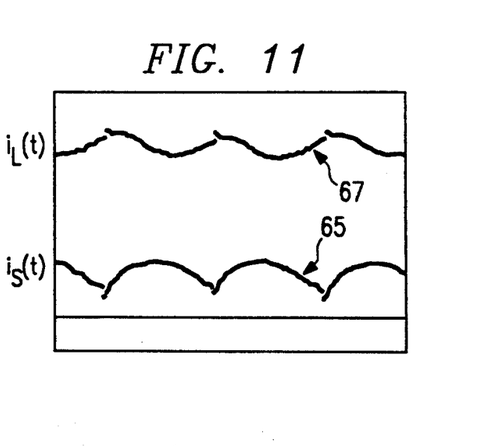

The simulation results of $i_S(t)$ 53 and $i_L(t)$ 55 for $V_o$ =60 V and $\phi$=40° for the single-phase converter circuit 20 are shown in FIG. 8 while the oscillograph obtained with the experimental unit for the input and output currents $i_S(t)$ 57 and $i_S(t)$ 59 respectively, under the same operating conditions appears in FIG. 9. The difference between the theoretical and experimental results is most likely due to circuit parasitic and lossy behavior of the experimental prototype. For example, the parasitic capacitances across the coils cause a ringing whenever switching takes place. The ringing frequency was observed to be 3.5 MHz. The simulation and experimental input and output currents, $i_S(t)$ and $i_L(t)$, for the same operating condition as before, but with the phase difference of 144° appear in FIGS. 10 and 11.

The experimental inverse dual converter circuit 20 was designed with unity nominal gain and the phase angle was chosen as the control element to vary the output voltage. Although the gain is theoretically independent of the input and output voltages, in practice, different gain versus phase characteristics were obtained at different voltage levels. The primary reason for this discrepancy is most likely that practical gain is also a function of efficiency. It was also observed that, as the input power increases, the efficiency improves. This is most likely due to the fact that conduction losses of a thyristor are dominant at low-power levels.

Figure 12:
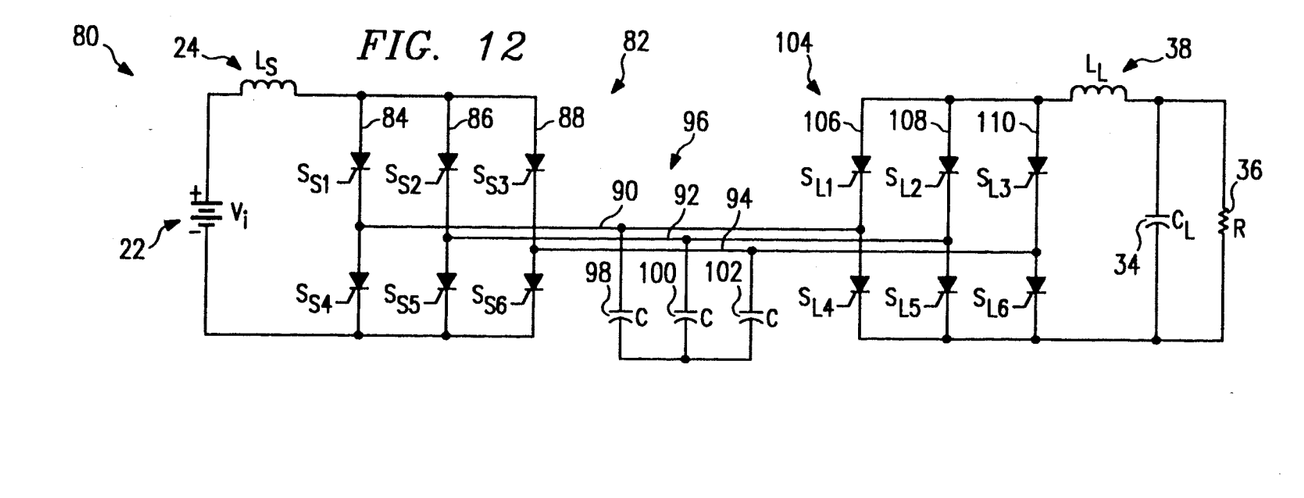
FIG. 12 illustrates a circuit diagram of a three-phase implementation of the preferred embodiment.

Several modifications of inverse dual DC-DC converter circuit 20 are possible to minimize size and weight of the preferred embodiment for aerospace applications. For example, one way to produce a low-input current ripple and output voltage ripple with the smallest filter components is to make a multi-phase converter circuit embodying the concepts of the present invention. FIG. 12 illustrates circuit 80 which embodies this concept. Three-phase inverse dual DC-DC converter circuit 80 includes input voltage $V_i$ 22 which directs source current $i_s$ through source inductor $L_S$ 24 and into three-phase source converter 82. With each phase 84, 86 and 88 of source converter 82 and AC link 90, 92, or 94, respectively, AC link circuit 96 associates respective AC link capacitors 98, 100, or 102. Moreover, AC link circuitry 96 associates three-phase source converter 82 to three-phase load converter 104 at phases 106, 108, and 110. As in the single-phase preferred embodiment, the three-phase inverse dual converter circuit 80 includes load capacitor $C_L$ 34, load R 36 and load inductor $I_L$ 38.

The output filter component values of three phase inverse dual converter circuit 80 may be designed to be significantly less than that of the single phase circuit 20 of the same performance specification. This, of course, is only achievable at the cost of additional switching elements and their support components. When weight and volume are critical design constraints, however, careful trade offs of silicon, inductance and capacitance must be evaluated.

The power relation and the gyration conductance for the three phase inverse dual converter circuit 80 are given as follows:

$$<P> = \frac{I_S I_L}{\omega C} (2\phi - 3\phi^2/2\pi) \quad \text{for } 0 < \phi < \pi/3 \quad (19)$$

$$<P> = \frac{I_S I_L}{\omega C} (3\phi - 3\phi^2/\pi - \pi/6) \quad \text{for } \pi/3 < \phi < 2\pi/3$$

$$<P> = \frac{I_S I_L}{\omega C} (\phi - 3\phi^2/2\pi - \pi/2) \quad \text{for } 2\pi/3 < \phi < 2\pi/3$$

The gyrator conductance g for the three-phase inverse dual converter circuit 80 is, therefore, given by the following set of equations:

$$g = \frac{\omega C}{2\phi - (3\phi^2/2\pi)} \quad \text{for } 0 < \phi < \pi/3 \quad (20)$$

$$g = \frac{\omega C}{2\phi - (3\phi^2/2\pi) - (3\phi^2/2\pi)} \quad \text{for } \pi/3 < \phi < 2\pi/3$$

$$g = \frac{\omega C}{2\phi - (3\phi^2/2\pi) - (3\phi^2/2\pi)} \quad \text{for } 2\pi/3 < \phi < 2\pi/3$$

For the $0 < \phi < \#/3$ interval, comparing Equation (19) with Equation (12) for a first-order approximation, it is feasible to assume that the capacitor required for the 3-phase convert circuit 80 is twice the value of that required for single-phase converter circuit 20 of the same power. Furthermore, since there are three capacitors 98, 100, and 102, the peak voltage will be six times less. The ripple frequency for the three-phase converter circuit 80 will be three times greater and, therefore, from Equations (16) and (17), the source inductor $L_S$ 24 and load inductor $L_L$ 38 will be approximately 18 times smaller than that of single-phase inverse dual converter circuit 20.

Yet another approach to reducing the filter requirements is a multi-pulsing technique. In the inverse dual converter system of the present invention, each side (source or load) may consist of two or more basic converters in series. A similar arrangement exists on the load side of the inverse dual DC-DC circuit 20. The output filter requirements of multi-pulsed converter circuits may be reduced all the way to zero, for certain high-power applications.

Overall, for the same power level the three-phase inverse dual converter circuit 80 is significantly smaller than the single-phase inverse dual converter circuit 20. Table 1 below provides a comparison of the single-phase converter circuit 20 to the 3-phase converter circuit 80.

TABLE 1

| FACTORS OF COMPARISON | SINGLE PHASE IDC | THREE PHASE IDC |
|---|---|---|
| Power rating | 100 kW | 100 kW |
| Output voltage | 270 V | 270 V |
| Input voltage | 28 V | 28 V |
| Control angle | 40 | 40 |
| Output voltage ripple | 1% | 1% |
| Number of switches | 8 | 12 |
| Peak voltage | 800 V | 525 V |
| Switch rms current | 2.4 KA/250 A | 2 KA/200 A |
| AC link capacitor | 22 $\mu$F | 50 $\mu$F |
| Cap.peak voltage | 800 V | 275 V |
| Cap.rms current | 3500 A | 3500 A |
| Input choke | 5.5 $\mu$H | 0.55 $\mu$H |
| Ind.voltage | 800 V | 250 V |
| Peak ind.current | 3200 A | 3200 A |
| Output choke | 26 $\mu$H | 2.3 $\mu$H |
| Ind.voltage | 800 V | 200 V |
| Peak ind.current | 395 A | 395 A |
| Filter cap. | 50 $\mu$F | 8 $\mu$F |

Furthermore, the three-phase inverse dual converter 80 increases the reliability of the DC-DC conversion since in the case of a switch failure, the three-phase converter 80 may make a transition to single-phase operation by providing the appropriate means of control.

Figure 13:
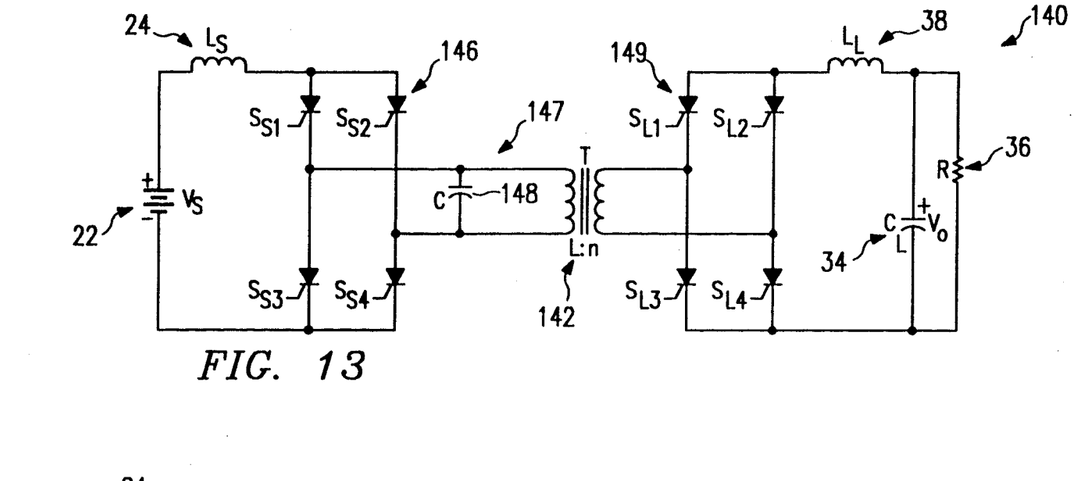
FIGS. 13 through 17 illustrate various topologies employing the preferred embodiment.

FIG. 13 provides yet another embodiment of the present invention that includes a transformer-coupled inverse dual converter circuit 140 that achieves DC isolation and lower device stresses. The transformer-coupled converter circuit 140 reduces the rating of the input bridge converter switches 146. Since the AC voltage rating of the capacitors at high frequencies is a critical factor, this topology provides the benefit of voltage rating reduction of link capacitor 148 of the same output voltage. In particular, within AC link circuit 147 additionally appears transformer 142 to couple source converter 146 and AC link capacitor 148 to load converter 149. The design of transformer-coupled converter circuit 140 requires additional attention in order to avoid possible undesirable resonant effects between AC link capacitor 148 and leakage inductance of transformer 142.

Figure 14:
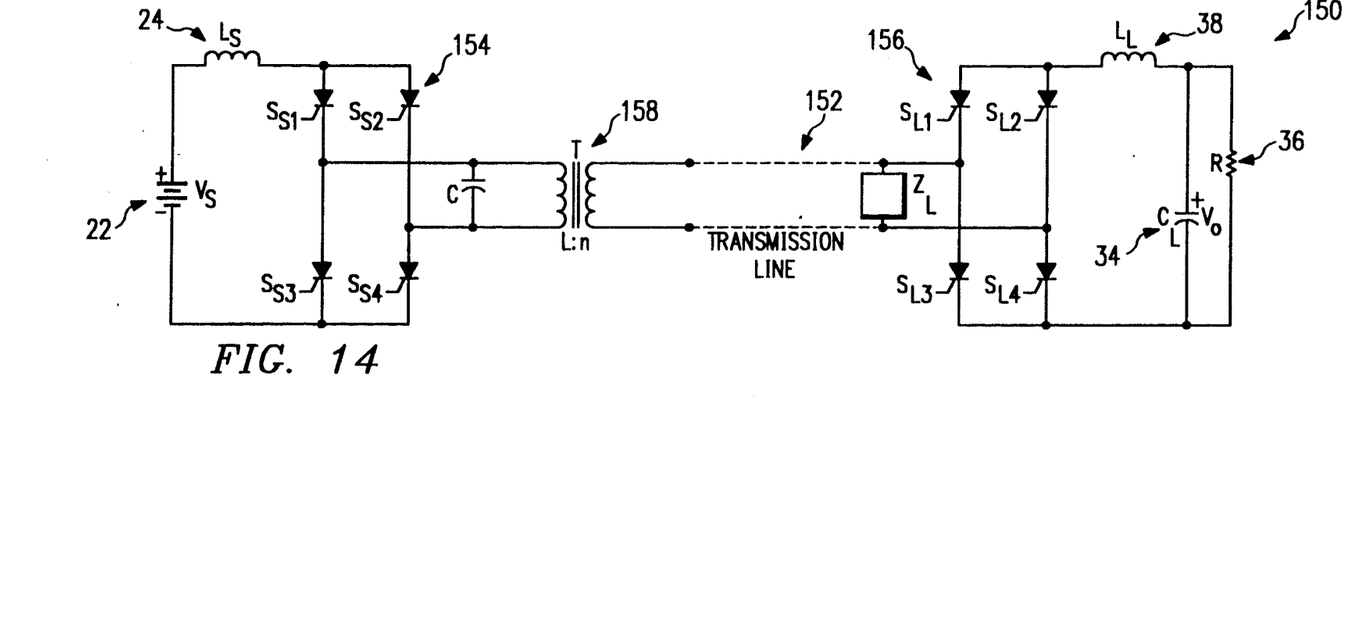

Transformer-coupled converter circuit 140 may be further expanded to circuit 150 of FIG. 14 that includes AC power transmission line 152 to link source side 154 to load side 156. The transmission voltage magnitude may be as high as required irrespective of voltage input. Furthermore, the voltage magnitude and phase may be controlled to accommodate system operational constraints. Moreover, although transformer 158 within circuit 150 provides some advantages, its integration into transmission line 152 is not necessarily required.

Figure 15:
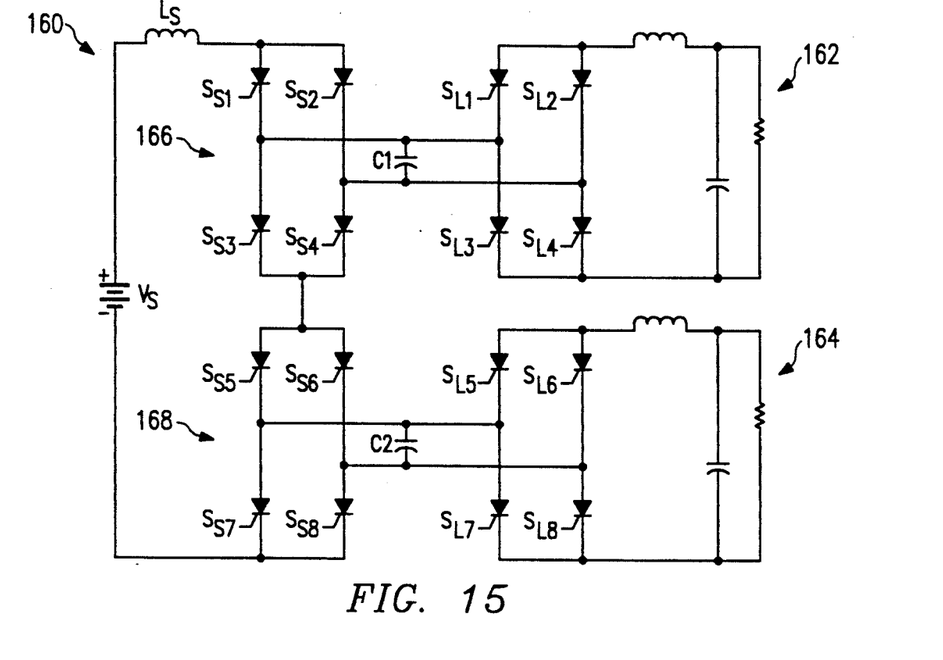
Figure 16:
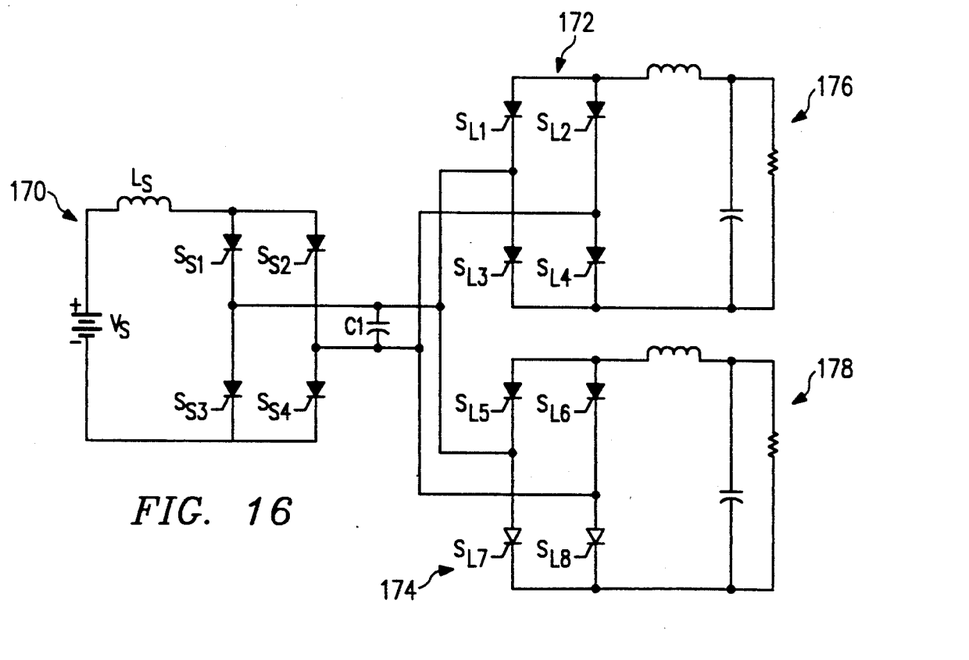

FIGS. 15 and 16 provide two topologies where several DC loads are served and output regulation is required for high-power applications. FIG. 15 shows circuit 160 that includes two serially-connected converter circuits 162 and 164. Within circuit 160, individual bridges 166 and 168 may be single or multi-phase, suitable for a converter with multiple regulated outputs.

FIG. 16 shows converter circuit 170 which incorporates the parallel distribution of converter load bridges 172 and 174 for two loads 176 and 178, respectively.

Both the circuit 160 of FIG. 15 and circuit 170 of FIG. 16 are capable of supporting individually regulated buck-boost operation for isolated loads. Regenerating loads also may augment the source converter in supplying the other load. Furthermore, the source and loads may be placed in different sites by providing a high-frequency AC transmission line between them. The advantages of high-frequency ac power distribution from the stand point of reduced size and weight and magnetic components and with regard to filtering requirements are discussed at length in O. Wasynczuk & P. C. Krause, Simulation and Control of a 20-kHz Spacecraft Power System, "IEEE Trans. on Aerospace and Elec. Sys. Vol. 25, No. 5, pp. 668-675 (Sep. 1989). Unlike the parallel distribution circuit 170 of FIG. 16, the serially-connected converter circuit 160 of FIG. 15 provides fully independent control of individual converter circuits 162 and 164. Both phase and frequency control strategies, therefore, may be applied to each serial converter 162 or 164.

Figure 17:
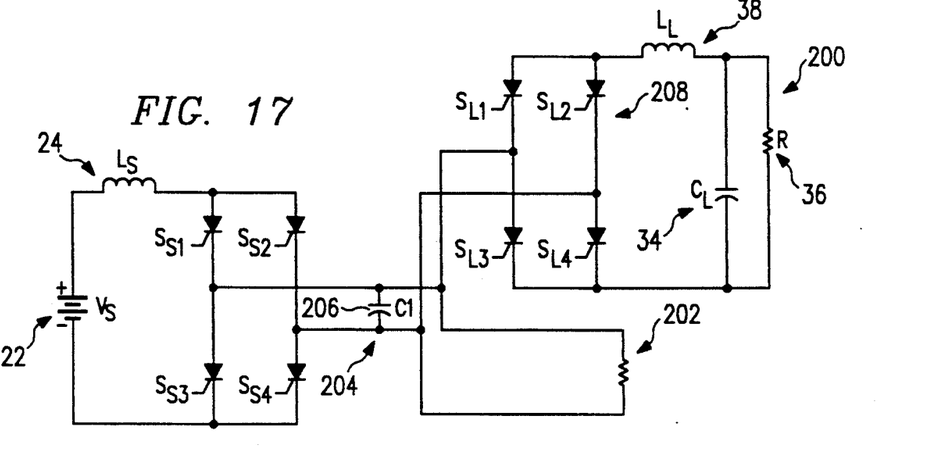

FIG. 17 illustrates a topology for supplying AC and DC loads with the inverse dual converter circuit of the present invention. For supplying AC loads, inverse dual converter circuit 200 includes AC tap-off circuitry 202 which connects to AC link circuitry 204 between AC link capacitor 206 and load converter 208. Simulation results have shown that AC link circuit 204 may be loaded to more than 50% of the overall converter rating and still allow operation of converter circuit 200 to supply DC loads. When both frequency and phase are used to control the DC gain, the tapped AC resistive load is unregulated. If only the phase is varied in order to adjust the gain, however, frequency control may be applied to control the AC voltage with the penalty of limited operating range.

Referring momentarily to FIGS. 4 through 7 and accompanying text, an important aspect of the use of gyrator modeling for the preferred embodiment is that the gyrator modeling technique describes completely both the steady state and transient behavior of inverse dual converter circuit 20. Because inverse dual circuit 20 of the preferred embodiment operates as a power supply, output voltage from load converter 32 and power must be controlled independently of input voltage $V_i$ 22. The gain formula of Equation (11) shows that the control may be accomplished by two elements: (1) operating phase and (2) frequency. These two variables are coupled and may be modulated in a coordinated fashion to accomplish dynamic control of inverse dual converter 20.

One attractive way to dynamically control inverse dual converter 20 is to choose the control operating point ($\phi$, $\omega$) so that the source inductor $L_S$ current $I_S$ (see Equation (13)) is maintained at specific level. Equations (11) and (13) determine the control operating point at any instant of time. Therefore, a system controller may be designed that is capable of controlling voltage gain and input current (or output voltage) smoothly through a wide range. This permits the preferred embodiment to provide both voltage step-up and step-down variably and continuously without the need for a transformer.

Figure 18:
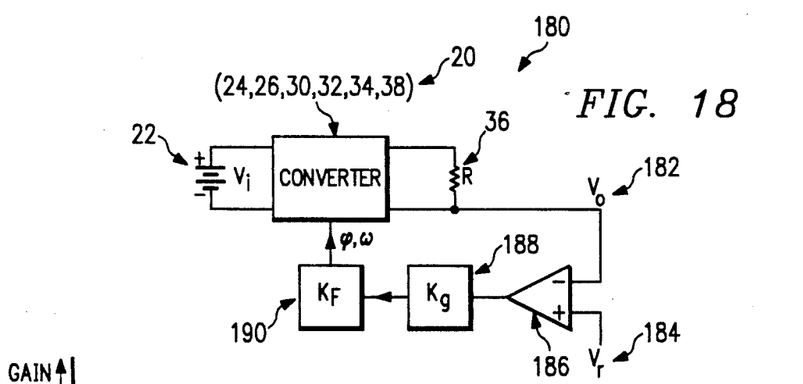
FIG. 18 provides a block diagram of a control system for the preferred embodiment.

FIG. 18 illustrates a control block diagram of a system 180 that includes inverse dual converter 20 to maintain operating point ($\phi$, $\omega$) for constant source inductor current $i_{sl}$. According to FIG. 18, input voltage $V_i$ 22 feeds into converter circuit 20 that includes elements 24, 26, 30, 32, 34, and 38 of FIG. 1 with load R 36 voltage $V^0$ 182 being sensed and referenced to $V_r$ 184 via comparator 186. Output from comparator 186 goes to block 188 for varying g which provides an input to frequency control network 190. As a result, frequency control network 190 provides adjustment to fire source converter 26 and load converter 32 to maintain average source inductor current $i_s$ at a constant level.

The above basic control strategy may be applied to many specific DC-DC converter applications such as regulated output control, tracking output voltage control, constant input power control and many others.

An alternative to the above phase $\phi$ and frequency $\omega$ control is the bang-bang technique which may be used by setting $\phi = 90°$ or $\omega = 90°$ alternately. The bang-bang control technique is described in detail in M. Ehsani et al. Converter Circuits or Super Conductive Magnetic Energy Storage, College Station Texas: Texas A&M Press, 1988), which is here incorporated by reference. Furthermore, a microprocessor control technique, with the combination of all possible techniques, may be used to optimize the operation of converter control circuit 180. As a result, a wide range of output voltage control for inverse dual DC-DC converter 20 is possible.

Figure 19:
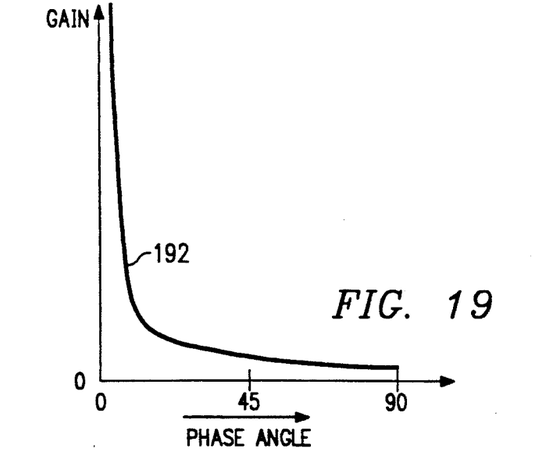
FIG. 19 shows a gain curve of a single phase implementation of the preferred embodiment to illustrate sensitivity of the gain to phase variation for lower values of the operating angle.

FIG. 19 shows the gain curve 210 of the single-phase inverse dual converter circuit 20 to illustrate an advantage of using phase and frequency control at the same time. As FIG. 19 illustrates, gain is very sensitive to phase variation $\phi$ for lower values in the operating angle. When the angle control enters the sensitive range, frequency control provides new operating limits for phase control with desired sensitivity and gain. The following equation illustrates that to operate at higher loads which may be beyond the phase control region, the frequency may be changed to achieve a stable operating point:

$$\phi = \frac{\pi}{2}\left(1 + \frac{1 - 8fC}{<V_o/V_i>}\right) \quad (21)$$

Furthermore, substantial ripple current reduction may be achieved by controlling the upper bridge phase angle in respect to the lower bridge switching pattern when both bridges operate at a common frequency.

In summary, the present invention provides a inverse dual DC-DC converter circuit suitable for high-power DC-DC conversion applications. In the preferred embodiment, the inverse dual DC-DC converter circuit is a voltage source converter with an AC link circuit comprising AC link capacitor and includes an inverse dual converter bridge circuit having a source converter and a load converter. The inverse dual converter circuit is capable of continuous voltage step-up or step-down control over a wide range without the need of a transformer. In addition to high-frequency switching, the converter circuit of the present invention is characterized by soft-switching techniques that reduce constraints on the ratings of switches and possesses several attractive features, including the following:

(a) buck-boost operation;
(b) bi-directional power processing;
(c) capacitive commutation of the switches;
(d) simple circuit implementation;
(e) a small number of components;
(f) efficient high-frequency operations; and
(g) unlimited high-power capability.

For further increasing power density, alternative embodiments of the present invention have been described that decrease component sizes and device and component stresses for various applications.

The preferred embodiment of the present invention has been described in detail. However, it will be appreciated that those skilled in the art, upon consideration of the present disclosure, may make modifications and improvements of this invention and still be within the scope and spirit of this invention as set forth in the following claims.

What is claimed is:

1. An inverse dual DC-DC converter circuit, comprising:
   an input DC voltage source for supplying an input DC voltage;
   an inverse dual converter bridge associated with said voltage source for receiving said input DC voltage and generating an output DC voltage, said inverse dual converter bridge having a source side and a load side, said source side including a source voltage converter in series with a source inductor, and said load side including a load voltage converter in series with a load inductor; and
   circuitry for delivering said output DC voltage to a DC load.

2. The apparatus of claim 1, and further comprising an AC link, and wherein said source side receives said input DC voltage and said load side outputs said output DC voltage, said source side operable to convert said input DC voltage to an AC voltage and said load side operable to convert said AC voltage to said output DC voltage, and said AC link operable to direct said AC voltage from said source voltage converter to said load voltage converter.

3. The apparatus of claim 2, wherein said source voltage converter and said load voltage converter operate at a common frequency, but at a different phase.

4. The apparatus of claim 3, wherein said source voltage converter comprise four source voltage switches $S_{S1}$, $S_{S2}$, $S_{S3}$, and $S_{S4}$, said source voltage switches associated to operate in an alternating sequence having a first path and a second path, said first path utilizing switches $S_{S1}$ and $S_{S4}$ and said second path utilizing switches $S_{S2}$ and $S_{S3}$.

5. The apparatus of claim 3, wherein said load voltage converter comprises four switches $S_{L1}$, $S_{L2}$, $S_{L3}$, and $S_{L4}$, said four switches operating in an alternating sequence of a first path and a second path, said first path using said voltage switches $S_{L1}$ and $S_{L2}$ and said second path using said switches $S_{L2}$ and $S_{L3}$.

6. The apparatus of claim 3, wherein said converter comprise a plurality of thyristors.

7. The apparatus of claim 3, wherein said converter comprises a plurality of gate turn-off switches.

8. The apparatus of claim 3, wherein said A-C link stores energy from said source voltage converter and transfers said energy from said source side to said load side and further supplies reverse voltage for commutation of said converters.

9. The apparatus of claim 2, further comprising means for controlling said output DC voltage.

10. The apparatus of claim 9, further comprising means for regulating output current continuity.

11. The apparatus of claim 2, wherein said AC voltage comprises a single-phase AC voltage.

12. The apparatus of claim 2, wherein said AC voltage comprises a three-phase AC voltage.

13. The apparatus of claim 2, wherein said AC link comprises a transformer between said source side and said load side.

14. The apparatus of claim 2, wherein said AC link comprises a transmission line associated between said source side and said load side.

15. The apparatus of claim 14, wherein said AC link comprises a transformer associated with said transmission line and between said source side and said load side.

16. The apparatus of claim 1, wherein said source side comprises a plurality of serially-connected source voltage converters, and wherein said load side comprises a plurality of load voltage converters for producing a plurality of output DC voltages, said load voltage converters coupled to said source voltage converters across a plurality of AC links.

17. The apparatus of claim 2, wherein said load side comprises a plurality of parallel-connected load voltage converters for providing a plurality of parallel DC output voltages.

18. The apparatus of claim 2, further comprising circuitry associated with said AC link for providing an AC output voltage.

19. A method for converting and providing an inverse dual DC-DC voltage, comprising the steps of:
   providing an input DC voltage;
   converting said input DC voltage to an AC voltage on a source side of an inverse dual converter bridge using a source voltage converter in series with a source inductor;
   converting said AC voltage to an output DC voltage on a load side of said inverse dual converter bridge using a load voltage converter in series with a load inductor; and
   delivering said output DC voltage to a load.

20. The method of claim 19, further comprising the steps of:
   linking said source side to an AC link circuit having an AC link capacitor;
   linking said AC link circuit to the load side of said inverse dual converter bridge.

21. The method of claim 19, further comprising the step of operating said source side and said load side of said inverse dual converter bridge at a common frequency but at a different phase.

22. The method of claim 20, wherein said source voltage converter comprises four source voltage switches $S_{S1}$, $S_{S2}$, $S_{S3}$ and $S_{S4}$, and further comprising the step of sequentially operating said source voltage switches in a first path and a second path, said first path comprising source voltage switches $S_{S1}$ and $S_{S2}$ and said second path comprising source voltage switches $S_{S2}$ and $S_{S3}$.

23. The method of claim 20, wherein said load voltage converter comprises four load voltage switches $S_{L1}$, $S_{L2}$, $S_{L3}$, and $S_{L4}$ and further comprising the step of operating said four load voltage switches in an alternating sequence of a first path and a second path, wherein said alternating current flows first in load voltage switches $S_{L1}$ and $S_{L4}$, and then through said second path through load voltage switches $S_{L2}$ and $S_{L3}$.

24. The method of claim 20, wherein said source voltage converter comprises a plurality of thyristors and further comprising the step of flowing said alternating current through said thyristors.

25. The method, of claim 20, wherein said source voltage, converter comprises a plurality of gate turn-off switches and further comprising the step of flowing said alternating current voltage through said gate turn-off switches.

26. The method of claim 20, further comprising the steps of:
storing energy from said source voltage converter transferring said energy from said source side to said load side using an AC link capacitor; and
supplying reverse voltage for computation from said link capacitor.

27. The method of claim 20, further comprising the step of controlling said output DC voltage.

28. The method of claim 27, further comprising the step of regulating output current continuity within said inverse dual converter bridge.

29. The method of claim 20, further comprising the step of producing a single-phase AC voltage between said source side and said load side.

30. The method of claim 20, further comprising the step of generating a three-phase AC voltage between said source side and said load side.

31. The method of claim 20, further comprising the step of transforming said AC voltage between said source side and said load side using a transformer.

32. The method of claim 20, further comprising the step of transmitting said AC voltage between said source side and said load side using a transmission line.

33. The method of claim 32, further comprising the step of transforming said AC voltage between said source side and said load side using a transformer.

34. The method of claim 20, further comprising the steps of:
serially connecting a plurality of source voltage converters; and
coupling a plurality of load voltage converters to the source voltage converters across a plurality of AC links, such that a plurality of output DC voltages are provided.

35. The method of claim 20, further comprising the steps of connecting in parallel a plurality of load voltage converters and providing a plurality parallel output of voltages.

36. The method of claim 20, further comprising the steps of:
tapping said AC link circuit using as AC tapping circuit; and
providing an output AC voltage from said AC tapping circuit.

37. A system for providing inverse dual DC-DC conversion, comprising:
an input DC voltage source for providing an input DC voltage;
an inverse dual converter circuit associated with said input DC voltage source for receiving said input DC voltage and generating an output DC voltage, said inverse dual converter circuit comprising a source side for converting said input DC voltage to an AC voltage and including a source voltage converter in series with a source inductor, an AC link circuit for receiving and transmitting said AC voltage, and a load side for receiving said AC voltage from said AC link circuit and converting said AC voltage to an output DC voltage and including a load voltage converter in series with a load inductor;
a comparator circuit for comparing said output DC voltage to a reference voltage; and
circuitry for adjusting said inverse dual converter circuit in response to the relationship of said output DC voltage to said reference voltage.

38. The system of claim 37, wherein said AC voltage comprises a single-phase AC voltage.

39. The system of claim 37, wherein said AC voltage comprises of three-phase AC voltage.

40. The system of claim 37, wherein said AC link circuitry comprises a transformer for transforming said AC voltage between said source side and said load side.

41. The system of claim 37, wherein said AC link circuit comprises a transmission line for transmitting said AC voltage.

42. The system of claim 41, wherein said AC link circuit further comprises a transformer associated with said transmission line for transforming said AC voltage between said source side and said load side.

43. The system of claim 37, and further comprising:
a plurality of serially-connected source voltage converters; and
a plurality of load voltage converters coupled to said source converters across a plurality of AC links to produce a plurality of output DC voltages.

44. A system of claim 37, further comprising a plurality of load voltage converters associated in parallel to provide a plurality of parallel output DC voltages.

45. The system of claim 37, further comprising an AC tapping circuit associated with AC link circuit for producing an output AC voltage from said AC link circuits.

46. An inverse dual DC-DC converter circuit, comprising:
an input DC voltage source for producing an input DC voltage $V_i$;
an inverse dual converter circuit associated with said input DC voltage source for receiving said input DC voltage and converting said input DC voltage to an output DC voltage $V_o$, and comprising a source voltage converter in series with a source inductor, a load voltage converter in series with a load inductor, an AC link, and operable to drive a load, wherein the ratio of output DC voltage $V_o$ to input DC voltage $V_i$ may be characterized by the following expression:

$$\frac{V_o}{V_i} = \frac{\omega C}{\phi - (\phi^2/\pi)} \cdot R,$$

wherein $\omega$ is the angular frequency of said source voltage converter, $\phi$ is the advance angle of said load voltage converter, C is the capacitance of said AC link, and R is the resistance of said load.

47. The apparatus of claim 46, wherein said inverse dual converter circuit comprises a source inductor $L_S$, such that the following equation characterizes the source inductor inductance;

$$L_s = \frac{1}{32Crf^2},$$

wherein r is the ripple factor and f is the operating frequency of said inverse dual converter.

48. The apparatus of claim 46, wherein said inverse dual converter circuit further comprises a load inductor $L_l$ for which the following expression characterizes the load inductor inductance:

$$L_s = \frac{n}{32rf_2C},$$

wherein r is the ripple factor, f is the operating frequency, and n is the ratio of average input and output currents of said inverse dual converter.

49. The apparatus of claim 46, wherein said inverse dual converter circuit further comprises a load capacitor $C_L$ for which the following equation characterizes the capacitance:

$$C_L = \frac{\Delta i_1}{8f_r \Delta V_{CL}},$$

wherein $f_r$ is the ripple frequency of said inverse dual converter, $\Delta V_{CL}$ is the ripple voltage across said load capacitor, and $\Delta i_1$ is the ripple current through said load capacitor.

* * * * *

UNITED STATES PATENT AND TRADEMARK OFFICE
CERTIFICATE OF CORRECTION

PATENT NO. : 5,208,740

DATED : May 4, 1993

INVENTOR(S) : Mehrdad Ehsani

It is certified that error appears in the above-identified patent and that said Letters Patent is hereby corrected as shown below:

Column 3, line 67, after "1a" insert -- illustrates --.

Column 4, line 16, after "voltage" delete "$V_1$" and insert -- $V_i$ --.

Column 4, line 60, after "transfer" delete "betweentwo" and insert -- between two --.

Column 5, line 3, after "$V_L$" delete "-$L_L$" and insert -- -$L_L I_L$ --.

Column 5, line 23, delete "$<P> = KI_s I_L$".

Column 5, line 62, after "will" delete "allowefficient" and insert -- allow efficient --.

Column 7, line 31, after "voltage" delete "$V_i$that" and insert -- $V_i$ that --.

Column 8, line 14, after "where" delete "$f_f$" and insert -- $f_r$ --.

UNITED STATES PATENT AND TRADEMARK OFFICE
CERTIFICATE OF CORRECTION

PATENT NO. : 5,208,740
DATED : May 4, 1993
INVENTOR(S) : Mehrdad Ehsani

It is certified that error appears in the above-identified patent and that said Letters Patent is hereby corrected as shown below:

Column 9, line 45, after "the" delete "$0<\dot{\phi}<\#/3$" and insert -- $0<\dot{\phi}<\pi/3$ --.

Column 11, line 66, after "current" delete "$i_{sl}$" and insert -- $i_s$ --.

Claim 6, column 13, line 53, delete "comprise" and insert -- comprises --.

Signed and Sealed this

Eighth Day of November, 1994

Attest:

BRUCE LEHMAN

*Attesting Officer*    *Commissioner of Patents and Trademarks*